United States Patent [19]

Tanabe

[11] 3,955,048
[45] May 4, 1976

[54] SCANNING METHOD AND APPARATUS
[75] Inventor: Minoru Tanabe, Ebina, Japan
[73] Assignee: Fuji Xerox Co., Ltd., Tokyo, Japan
[22] Filed: Aug. 23, 1974
[21] Appl. No.: 499,996

[30] Foreign Application Priority Data
Aug. 30, 1973 Japan.............................. 48-96660

[52] U.S. Cl. ............................................. 178/7.6
[51] Int. Cl.² ......................................... H04N 1/04
[58] Field of Search ................................. 178/7.6

[56] References Cited
UNITED STATES PATENTS 3,064,077  11/1962  Cary .................................... 178/7.6
3,646,568  2/1972  Woywood............................ 178/7.6
3,668,409  6/1972  Tuhro ................................. 178/7.6

Primary Examiner—Howard W. Britton
Assistant Examiner—Michael A. Masinick
Attorney, Agent, or Firm—Gerald J. Ferguson, Jr.; Joseph J. Baker

[57] ABSTRACT

A method and apparatus for scanning a moving document, the method including the steps of projecting a beam of light; dividing the beam of light into a plurality of divided light beams; successively scanning the divided light beams over a common area adjacent said moving document so that as the document passes the common area, successive portions thereof are scanned until the entirety of the document is scanned.

7 Claims, 2 Drawing Figures

SCANNING METHOD AND APPARATUS

BACKGROUND OF THE INVENTION

1. Field of the Invention.

The present invention relates to a scanning method and apparatus which, for example, may be used in the transmitter and/or receiver of a facsimile system or in an electrographic copier.

2. Discussion of the Prior Art.

In typical scanning methods except when line scanning is effected only by the rocking of a reflector, a main scan is generally effected by the rocking of reflector while a subsidiary scan is effected by movement of the document (zinc oxide paper or some other recording paper) past the scanning reflector. However, when scanning is effected by rocking a reflector, there is an inevitable limitation on the scanning speed due to the mechanical rocking of the reflector.

In another scanning method, a reflector is continuously rotated in the same direction. In yet another method, a mirror drum having a multi-face mirror rotor is used. However, these methods also have problems with respect to scanning speed or displacement of the main optical axis.

SUMMARY OF THE INVENTION

A primary object of this invention is to provide an improved scanning method and apparatus where the displacement of the main optical axis found in multi-face mirror rotor scanners is minimized and increased scanning speed is obtained.

Other objects and advantages of the invention will become apparent from a reading of the specification and claims taken with the drawing.

DETAILED DESCRIPTION OF A PREFERRED EMBODIMENT OF THE INVENTION

Figure 1:
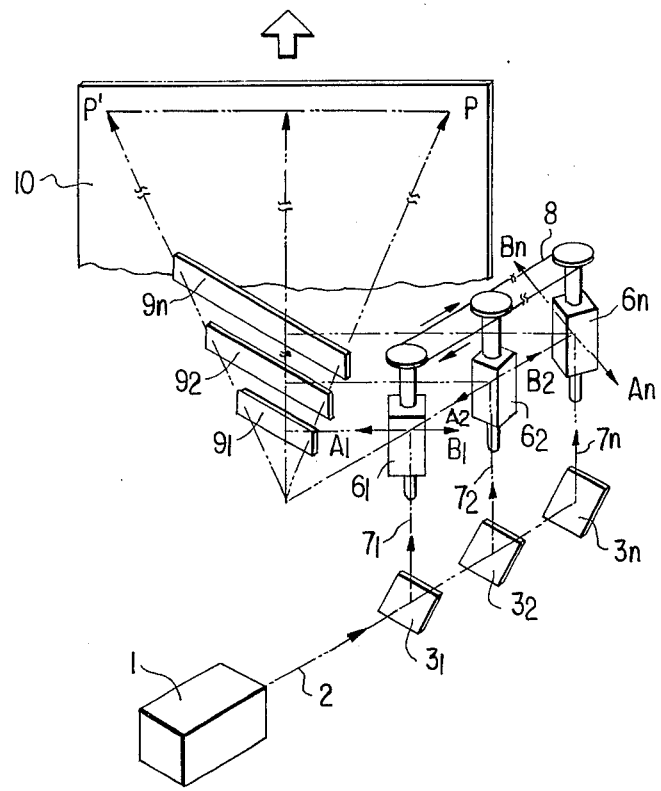
FIG. 1 is a schematic drawing of an illustrative embodiment of the invention.

FIG. 1 is a schematic illustration of an embodiment of the invention wherein a scanning device according to the invention may be utilized at the receiver side of a facsimile system. A light source 1 such as a laser has an optical axis 2. Provided on said optical axis 2 are n sheets of scanning beam dividing semitransparent mirrors $3_1, 3_2...3_k...3_n$. Mirror $3_k$ is not shown; however, the subscript k will be used to hereinafter indicate the $k^{th}$ element of any succession of elements, the $k^{th}$ element being the general element where $k=1,2...n$. Mirror $3_n$ may be a reflector only.

Figure 2:
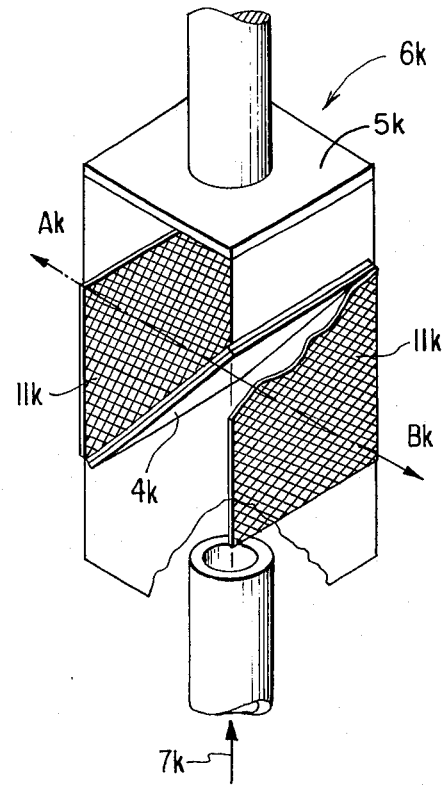
FIG. 2 is a partially broken, enlarged perspective view of a portion of the FIG. 1 embodiment.

On each reflection optical axis $7_1, 7_2...7_k...7_n$ of the scanning beam dividing semitransparent mirrors, rotary reflection means $6_1, 6_2...6_k...6_n$ are provided. As indicated in FIG. 2 in enlarged and partially broken view, each rotary reflection means $6_k$ reflects the divided scanning beam from scanning beam dividing semitransparent mirror $3_k$ in the two directions $A_k$ and $B_k$ by semitransparent mirror $4_k$ and reflector $5_k$. Attenuators $11_k$ adjust the reflected light volume from rotary reflection means $6_k$ where the attenuators may comprise filters made of glass or gelatin containing appropriate absorption material or a pair of polarizer plates.

Semitransparent mirrors $9_1, 9_2...9_k...9_n$ direct reflected light from rotary reflecting means $6_1, 6_2...6_k...6_n$ to a moving document 10 such as a zinc oxide paper or other recording paper.

Each rotary reflection means $6_1, 6_2...6_k...6_n$ is rotated at the same speed by a driving means 8. As indicated in FIG. 1, the semitransparent mirror $4_1$ of rotary reflection means $6_1$ is so positioned that it scans the input beam thereto along a stationary semitransparent mirror $9_1$ prior to the scanning of a stationary semitransparent mirror $9_2$ by the beam applied to a semitransparent mirror $4_2$ of rotary reflecting means $6_2$. Thus, the semitransparent mirror $4_1$ of rotary reflecting means $6_1$ is angularly positioned in front of semitransparent mirror $4_2$ of rotary reflecting means $6_2$. If three rotary reflectors are used, the angular difference between the positions of semitransparent mirrors $4_1$ and $4_2$ would be 60°. In general where there are n reflectors, the $4_{k-1}$ semitransparent mirror is $360/2n°$ in front of the $4_k$ semitransparent mirror where of course k-1 is undefined when k=1.

As indicated in FIG. 1, semitransparent mirrors $9_1, 9_2...9_k...9_n$ are disposed in front of one another while the rotary reflecting means $6_1, 6_2...6_k...6_n$ are so disposed with respect to one another that the output beams therefrom respectively scan semitransparent mirrors $9_1, 9_2...9_k...9_n$. In particular, when the rotary reflecting means are as positioned in FIG. 1, the output beam $A_1$ will scan mirror $9_1$ as rotary reflecting means $6_1$ rotates from the position shown in FIG. 1. As the $A_1$ beam scans mirror $9_1$ it is reflected therefrom and transmitted through mirrors $9_2$ through $9_n$ where it scans a common area extending from P to P'. The moving document 10 will be in the position shown in FIG. 1, and thus the portion thereof underneath common area P–P' is scanned at this time.

As soon as beam $A_1$ finishes scanning mirror $9_1$, beam $A_2$ starts scanning mirror $9_2$ since mirror $4_2$ has now been rotated to a position where output beam $A_2$ is directed at one end of mirror $9_2$. As rotary reflection means $6_2$ continues to rotate, beam $A_2$ scans mirror $9_2$ from whence it is reflected through mirrors $9_3$ (not shown)...$9_k...9_n$ to scan common area P–P'. By this time a different portion of moving document 10 is under common area P–P' so that this new portion of document 10 is scanned.

In the foregoing manner successive portions of document 10 are scanned. In general, the common area P–P' is successively scanned by beams $A_1, A_2...A_k...A_n, B_1,B_2...B_k...B_n, A_1...$, starting from the position shown in FIG. 1. Further, each beam $A_1, A_2$ etc. is effective for purposes of scanning document 10 for an angular rotation of rotary reflecting means $6_1,6_2...6_k...6_n$ of $360/2n°$, the difference in the angular orientation of each scanning mirror $4_1,4_2...4_k...4_n$ with respect to the mirrors adjacent thereto.

If a lamp with large unit energy such as a laser is used for light souce 1, decreased light because of dividing by the semitransparent mirrors will be no problem.

As can be seen from the aforegoing description, the scanning method and apparatus of this invention divide the scanning beam from source 1 into plural beam lines and continuous scanning of the common scanning area P-P' is successively effected by the divided scanning beams. Thus, the scanning speed can be increased with minimal mechanical vibration or main optical axis displacement.

What is claimed is:

1. Apparatus for scanning a moving document comprising
   means for projecting a beam of light;
   means for dividing the beam of light into a plurality of divided light beams; and
   scanning means for successively scanning the divided light beams over a common area adjacent said moving document so that as said document passes said common area, successive portions thereof are scanned until the entirety of said document is scanned
   said scanning means including n rotating reflecting means respectively responsive to said divided light beams for respectively scanning the divided light beams across said common area, each rotating reflecting means including a plurality of reflecting surfaces disposed about its axis of rotation where the axes of rotation of said rotating reflecting means are displaced from and substantially parallel with one another and where the reflecting surfaces of each rotating reflecting means are so angularly disposed with respect to the reflecting surfaces of the rotating reflecting means adjacent thereto that the divided light beams are successively scanned across said common area.

2. Apparatus as in claim 1 where said scanning means comprises n rotating reflecting means respectively responsive to said divided light beams for respectively scanning the divided light beams across said common area, each rotating reflecting means being so angularly disposed with respect to the rotating reflecting means adjacent thereto that the divided light beams are successively scanned across said common area.

3. Apparatus as in claim 2 where the difference in the angular orientation of the $k^{th}$ and $(k-1)^{th}$ rotating reflecting means is $360/2n°$ where k=1, 2...n and k−1 is undefined when k=1.

4. Apparatus as in claim 3 where said scanning means includes n stationary semitransparent mirrors respectively associated with said n rotating reflecting means, the output beam $A_k$ from the $k^{th}$ rotating reflecting means being scanned across the $k^{th}$ semitransparent mirror as the $k^{th}$ rotating reflecting means rotates, beam $A_k$ then being reflected through the $(k+1)^{th}$, $(k+2)^{th}$...and $n^{th}$ semitransparent mirrors onto said common area.

5. Apparatus as in claim 3 where the $k^{th}$ rotating reflecting means includes means for further dividing the divided light beam applied thereto into two beams $A_k$ and $B_k$ which are directed in opposite directions with respect to each other, said common area being successively scanned by the further divided beams in the following order: $A_1, A_2...A_k...A_n, B_1, B_2...B_k...B_n, A_1...$ 6. Apparatus for scanning a moving document comprising
   means for projecting a beam of light;
   means for dividing the beam of light into a plurality of divided light beams; and
   scanning means for successively scanning the divided light beams over a common area adjacent said moving document so that as said document passes said common area, successive portions thereof are scanned until the entirety of said document is scanned
   said scanning means including n rotating reflecting means respectively responsive to said divided light beams for respectively scanning the divided light beams across said common area, each rotating reflecting means being so angularly disposed with respect to the rotating reflecting means adjacent thereto that the divided light beams are successively scanned across said common area, the difference in the angular orientation of the $k^{th}$ and $(k-1)^{th}$ rotating reflecting means being $360/2n°$ where k=1, 2...n and k−1 is undefined when k=1 and
   said scanning means including n stationary semitransparent mirrors respectively associated with said n rotating reflecting means, the output beam $A_k$ from the $k^{th}$ rotating reflecting means being scanned across the $k^{th}$ semitransparent mirror as the $k^{th}$ rotating reflecting means rotates, beam $A_k$ then being reflected through the $(k+1)^{th}$, $(k+2)^{th}$...and $n^{th}$ semitransparent mirrors onto said common area.

7. Apparatus for scanning a moving document comprising
   means for projecting a beam of light;
   means for dividing the beam of light into a plurality of divided light beams; and
   scanning means for successively scanning the divided light beams over a common area adjacent said moving document so that as said document passes said common area, successive portions thereof are scanned until the entirety of said document is scanned
   said scanning means including n rotating reflecting means respectively responsive to said divided light beams for respectively scanning the divided light beams across said common area, each rotating reflecting means being so angularly disposed with respect to the rotating reflecting means adjacent thereto that the divided light beams are successively scanned across said common area, the difference in the angular orientation of the $k^{th}$ and $(k-1)^{th}$ rotating reflecting means being $360/2n°$ where k=1, 2...n and k−1 is undefined when k=1 and
   the $k^{th}$ rotating reflecting means including means for further dividing the divided light beam applied thereto into two beams $A_k$ and $B_k$ which are directed in opposite directions with respect to each other, said common area being successively scanned by the further divided beams in the following order: $A_1, A_2...A_k...A_n, B_1, B_2...B_k...B_n, A_1...$

* * * * *